(12) United States Patent
Chazin et al.

(10) Patent No.: US 9,202,076 B1
(45) Date of Patent: *Dec. 1, 2015

(54) SYSTEMS AND METHODS FOR SHARING DATA STORED ON SECURE THIRD-PARTY STORAGE PLATFORMS

(71) Applicant: Symantec Corporation, Mountain View, CA (US)

(72) Inventors: Steve Chazin, Hollis, NH (US); Walter Bogorad, Danville, CA (US); Phil Polishuk, Berkeley, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/952,487

(22) Filed: Jul. 26, 2013

(51) Int. Cl.
*H04L 29/06* (2006.01)
*G06F 21/62* (2013.01)

(52) U.S. Cl.
CPC .................. *G06F 21/6218* (2013.01)

(58) Field of Classification Search
CPC ......... G06F 21/00; G06F 21/10; G06F 21/60; G06F 21/62; G06F 21/6208; G06F 21/6218; G06F 2221/2137; H04L 9/30
USPC ........................................................ 713/165
See application file for complete search history.

(56) References Cited

U.S. PATENT DOCUMENTS

| | | | |
|---|---|---|---|
| 6,947,556 B1 | 9/2005 | Matyas, Jr. et al. | |
| 7,487,219 B1 | 2/2009 | Jia et al. | |
| 7,505,978 B2 | 3/2009 | Bodin et al. | |
| 7,949,681 B2 | 5/2011 | Bodin et al. | |
| 8,090,102 B2 | 1/2012 | Kitaya et al. | |
| 8,904,503 B2 | 12/2014 | Agbabian | |
| 9,076,004 B1 | 7/2015 | Bogorad | |
| 2001/0029581 A1 | 10/2001 | Knauft et al. | |

(Continued)

FOREIGN PATENT DOCUMENTS

| | | |
|---|---|---|
| EP | 1688858 A1 | 8/2006 |
| EP | 2336886 | 6/2011 |
| WO | WO-2008/124201 | 10/2008 |

OTHER PUBLICATIONS

Sanjay Sawhney et al.; Systems and Methods for Protecting Internet Sites from Botnet Attacks; U.S. Appl. No. 13/024,313, filed Feb. 9, 2011.

(Continued)

*Primary Examiner* — Dant Shaifer Harriman
(74) *Attorney, Agent, or Firm* — ALG Intellectual Property, LLC

(57) ABSTRACT

A computer-implemented method for sharing data stored on secure third-party storage platforms may include (1) identifying a request from a client system for a token that provides temporary access to an encrypted file stored under a user account, (2) identifying, in response to the request, an asymmetric key pair designated for the user account that includes an encryption key and a decryption key that has been encrypted with a client-side key, (3) receiving, from the client system, the client-side key, (4) decrypting the decryption key with the client-side key, (5) using the decryption key to generate temporary decryption data that facilitates the decryption of the encrypted file and that is set to expire, (6) generating the token and designating the temporary decryption data as available in exchange for the token, and (7) providing the token to the client system. Various other methods, systems, and computer-readable media are also disclosed.

20 Claims, 7 Drawing Sheets

(56) References Cited

U.S. PATENT DOCUMENTS

| | | | |
|---|---|---|---|
| 2003/0163705 | A1 | 8/2003 | Richards, Jr. et al. |
| 2003/0174841 | A1 | 9/2003 | Nault et al. |
| 2004/0024688 | A1* | 2/2004 | Bi et al. ............... 705/37 |
| 2005/0033967 | A1* | 2/2005 | Morino et al. ........... 713/182 |
| 2005/0071658 | A1 | 3/2005 | Nath et al. |
| 2005/0157880 | A1 | 7/2005 | Kurn et al. |
| 2006/0224729 | A1* | 10/2006 | Rowe et al. ............ 709/224 |
| 2009/0313353 | A1 | 12/2009 | Lou |
| 2010/0172504 | A1 | 7/2010 | Allen et al. |
| 2010/0217987 | A1 | 8/2010 | Shevade |
| 2010/0257351 | A1 | 10/2010 | O'Connor et al. |
| 2010/0306176 | A1 | 12/2010 | Johnson et al. |
| 2011/0154031 | A1 | 6/2011 | Banerjee et al. |
| 2011/0258333 | A1 | 10/2011 | Pomerantz et al. |
| 2012/0328105 | A1 | 12/2012 | Mukkara et al. |
| 2012/0331518 | A1* | 12/2012 | Lee ............... 726/1 |
| 2013/0111217 | A1 | 5/2013 | Kopasz et al. |
| 2013/0145160 | A1* | 6/2013 | Bursell ............ 713/168 |
| 2013/0179199 | A1* | 7/2013 | Ziskind et al. ............ 705/5 |
| 2014/0047513 | A1* | 2/2014 | van 't Noordende ........ 726/4 |
| 2014/0281520 | A1* | 9/2014 | Selgas et al. ............ 713/165 |

OTHER PUBLICATIONS

Deb Banerjee; Systems and Methods for Workload Security in Virtual Data Centers; U.S. Appl. No. 13/291,716, filed Nov. 8, 2011.
Deb Banerjee; Systems and Methods for Optimizing Security Controls for Virtual Data Centers; U.S. Appl. No. 13/471,166, filed May 14, 2012.
Walter Bogorad; Systems and Methods for Secure Third-Party Storage; U.S. Appl. No. 13/800,305, filed Mar. 13, 2013.
Mulazzani, Martin et al., "Dark Clouds on the Horizon: Using Cloud Storage as Attack Vector and Online Slack Space", http://publik.tuwien.ac.at/files/PubDat_202722.pdf, as accessed on Mar. 2, 2012, SBA Research, (Sep. 18, 2011).
Amazon, "Amazon Simple Storage Service (Amazon S3)", http://aws.amazon.com/s3/, as accessed on Mar. 2, 2012, (Jul. 2006).
Box.Net, Inc., "Comprehensive Security at all Levels", http://www.box.net/static/download/Security_Overview_2-1.pdf, as accessed on Mar. 2, 2012, (Mar. 2009).
Perez, Sarah, "Finally! Bitcasa CEO Explains How the Encryption Works", http://techcrunch.com/2011/09/18/bitcasa-explains-encryption/, as accessed on Mar. 2, 2012, (Sep. 18, 2011).
Storer, Mark W., et al., "Secure Data Deduplication", http://www.ssrc.ucsc.edu/Papers/storer-storagess08.pdf, as accessed Mar. 2, 2012; Fairfax, VA, USA, StorageSS' 08, (Oct. 31, 2008).
Trimbak Bardale; Systems and Methods for Securely Deduplicating Data Owned by Multiple Entities; U.S. Appl. No. 12/874,640, filed Sep. 2, 2012.
Paul Agbabian; Systems and Methods for Providing Access to Data Accounts Within User Profiles Via Cloud-Based Storage Services; U.S. Appl. No. 13/742,217, filed Jan. 15, 2013.
Yu, Shucheng et al., "Achieving Secure, Scalable, and Fine-grained Data Access Control in Cloud Computing", Infocom, 2010 Proceedings IEEE, IEEE, Piscataway, NJ, USA, (Mar 14, 2010).
Tsai, Wei-Tek et al., "Role-Based Access-Control Using Reference Ontology in Clouds", Autonomous Decetralized Systems (ISADS), 2011 10th International Symposium on, IEEE, (Mar. 23, 2011).
"Private Cloud for Your Enterprise—Installable Cloud Storage Solution for Security & Control", http://www.gladinet.com/CloudEnterprise/, as accessed Apr. 16, 2014, Gladinet, Inc., (2008).
"Syncplicity by EMC", http://www.syncplicity.com/solutions/, as accessed Apr. 16, 2014, Syncplicity LLC, (2007).
"Hybrid Deployment Architecture", http://www.ctera.com/products/technology/hybrid-deployment-architecture, as accessed Apr. 16, 2014, CTERA Networks Ltd., (Oct. 19, 2012).
Banerji, Preeta et al., "Deploying an Enterprise-Ready Content Sync-and-Share Solution", http://www.intel.com/content/dam/www/public/us/en/documents/white-papers/deploying-an-enterprise-ready-content-sync-and-share-solution.pdf, as accessed Apr. 16, 2014, IT@Intel White Paper, Intel Corporation, (Sep. 2013).
"Newest ownCloud Enterprise File Sync and Share Keeps IT in Control of Corporate Data", https://owncloud.com/blog/newest-owncloud-enterprise-file-sync-share-keeps-control-corporate-data, as accessed Apr. 16, 2014, ownCloud Inc., Lexington, MA, (Mar. 11, 2014).
"kiteworks for Enterprise IT—Cloud Deployment Options", http://www.accellion.com/solutions/enterprise-it-and-security/cloud-deployment-options, as accessed Apr. 16, 2014, Accellion, (Oct. 1, 2013).
Walter Bogorad; Systems and Methods for Secure Hybrid Third-party Data Storage; U.S. Appl. No. 14/720,684, filed May 22, 2015.
"join.me", https://www.join.me/?ReturnUrl=https://secure.join.me/federated/loginsso.aspx&TrackingUniqueId=168EB7ED-DF17-4D6B-A45C-0AC69E50FF44, as accessed Apr. 26, 2013, LogMeIn, Inc., (on or before Apr. 26, 2013).
"Dropbox", https://www.dropbox.com/, as accessed Apr. 26, 2013, (Dec. 26, 1996).
"Google Docs", https://www.google.com/docs/about/, as accessed Apr. 26, 2013, (Apr. 22, 2014).
"Box", https://www.box.com/, as accessed Apr. 26, 2013, (Feb. 29, 2000).
"Google Drive", https://www.google.com/drive/, as accessed Apr. 26, 2013, (Mar. 12, 2007).
"OneDrive (formerly SkyDrive)", https://onedrive.live.com/about/en-us/, as accessed Apr. 26, 2013, Microsoft, (on or before Apr. 26, 2013).
"WinZip", http://www.winzip.com/win/en/index.htm, as accessed Apr. 26, 2013, (Nov. 15, 2010).
"Wikisend", http://wikisend.com/, as accessed Apr. 26, 2013, (Feb. 25, 2008).
"Hightail (formerly YouSendIt)", https://www.hightail.com/, as accessed Apr. 26, 2013, (Mar. 2, 2001).
"GE.TT", http://ge.tt/, as accessed Apr. 26, 2013, (Nov. 27, 2010).
"Jumpshare", https://jumpshare.com/, as accessed Apr. 26, 2013, (May 12, 2010).
"SugarSync®", https://www.sugarsync.com/, as accessed Apr. 26, 2013, (Jan. 6, 2008).
"Shutterfly", https://www.shutterfly.com/, as accessed Apr. 26, 2013, (Nov. 27, 1999).
"Snapfish", http://www.snapfish.com/photo-gift/welcome, as accessed Apr. 26, 2013, (on or before Apr. 26, 2013).
Menezes, A. et al., "Chapter 13: Key Management Techniques", www.cacr.math.uwaterloo.ca/hac, Handbook of Applied Cryptography, CRC Press, Inc., (Oct. 1, 1996), pp. 543-590.

* cited by examiner

SYSTEMS AND METHODS FOR SHARING DATA STORED ON SECURE THIRD-PARTY STORAGE PLATFORMS

BACKGROUND

Organizations and consumers increasingly use third-party services to store data. Third-party storage services may provide a number of benefits to customers, including flexibility, low capitalization requirements, add-on services, data sharing, and centralized access to data.

Many third-party storage customers want or need to encrypt their data before submitting the same to a third-party storage vendor. For example, individual consumers may wish to encrypt data sent to third-party storage vendors due to privacy concerns. Similarly, organizations may wish to encrypt data sent to third-party storage vendors in order to ensure compliance with internal or external data-protection requirements, such as governmental laws and regulations, partnership agreements with other organizations, etc. Unfortunately, by encrypting data before submitting the same to a third-party storage system, customers may interfere with a third-party storage vendor's attempt to deduplicate the data. For example, if two customers encrypt identical files using different encryption schemes (e.g., different keys), the resulting encrypted files will differ, potentially preventing the third-party storage vendor from deduplicating the files into a single file that is referenced multiple times. Additionally, encrypting files before submitting the files to a third-party storage system may interfere with the ability of a third-party storage service to efficiently share the files with other users where directed.

Accordingly, the instant disclosure identifies and addresses a need for additional and improved systems and methods for sharing data stored on secure third-party storage platforms.

SUMMARY

As will be described in greater detail below, the instant disclosure generally relates to systems and methods for sharing data stored on secure third-party storage platforms by maintaining asymmetric key pairs for encrypting and decrypting secured data (e.g., files and/or encryption keys for files) on a third-party storage server, encrypting the decryption keys of these asymmetric key pairs with encryption keys maintained by clients, and, on request, generating and providing tokens that correspond to temporary decryption data such that a user with a token may temporarily access secured data.

In one example, a computer-implemented method for sharing data stored on secure third-party storage platforms may include (1) identifying, at a server-side computing system, a request from a client system for a token that provides temporary access to an encrypted file stored under a user account, where the temporary access requires decryption of the encrypted file, (2) identifying, in response to the request, an asymmetric key pair designated for the user account, the asymmetric key pair including an encryption key and a decryption key that has been encrypted with a client-side key, (3) receiving, from the client system, the client-side key, (4) decrypting the decryption key with the client-side key, (5) using the decryption key to generate temporary decryption data that facilitates the decryption of the encrypted file and that is set to expire, (6) generating the token and designating the temporary decryption data as available in exchange for the token, and (7) providing the token to the client system.

In some examples, using the decryption key to generate the temporary decryption data may include using the decryption key to generate a uniform resource locator that may include the temporary decryption data.

In one embodiment, the computer-implemented method may further include (1) receiving the token from an additional client system and (2) providing the temporary decryption data to the additional client system in response to receiving the token. Additionally or alternatively, the computer-implemented method may further include (1) receiving the temporary decryption data from an additional client system, (2) using the temporary decryption data to decrypt the encrypted file, and (3) providing access to an unencrypted version of the encrypted file to the additional client system.

In one example, the computer-implemented method may further include (1) determining that the token has expired, and (2) designating the temporary decryption data as no longer available in exchange for the token in response to determining that the token has expired. In some examples, the computer-implemented method may further include (1) receiving an unassigned token from an additional client system, and (2) preventing the additional client system from receiving the temporary decryption data in exchange for the token based on having received the unassigned token from the additional client system. Additionally or alternatively, the computer-implemented method may further include (1) receiving an unassigned token from an additional client system, (2) presenting a CAPTCHA to the additional client system in response to receiving the unassigned token from the additional client system, and (3) requiring that the additional client system provide a correct solution to the CAPTCHA before providing the additional client system with the temporary decryption data in exchange for the token.

In some embodiments, the token may be short (e.g., to make the token easier to relate to other people, to remember, and/or to enter into an interface). In some examples, generating the token may include generating the token according to a specification that is designed to facilitate storing the token in human working memory. Additionally or alternatively, generating the token may include generating the token to be five characters long.

In one embodiment, a system for implementing the above-described method may include (1) an identification module that identifies, at a server-side computing system, a request from a client system for a token that provides temporary access to an encrypted file stored under a user account, where the temporary access requires decryption of the encrypted file, (2) a key module that identifies, in response to the request, an asymmetric key pair designated for the user account, the asymmetric key pair including an encryption key and a decryption key that has been encrypted with a client-side key, (3) a receiving module that receives, from the client system, the client-side key, (4) a decryption module that decrypts the decryption key with the client-side key, (5) a using module that uses the decryption key to generate temporary decryption data that facilitates the decryption of the encrypted file and that is set to expire, (6) a generation module that generates the token and designates the temporary decryption data as available in exchange for the token, (7) a providing module that provides the token to the client system, and (8) at least one processor configured to execute the identification module, the key module, the receiving module, the decryption module, the using module, the generation module, and the providing module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify, at a server-side computing system, a request from a client system for a token that provides temporary access to an encrypted file stored under a user account, where the temporary access requires decryption of the encrypted file, (2) identify, in response to the request, an asymmetric key pair designated for the user account, the asymmetric key pair including an encryption key and a decryption key that has been encrypted with a client-side key, (3) receive, from the client system, the client-side key, (4) decrypt the decryption key with the client-side key, (5) use the decryption key to generate temporary decryption data that facilitates the decryption of the encrypted file and that is set to expire, (6) generate the token and designate the temporary decryption data as available in exchange for the token, and (7) provide the token to the client system.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
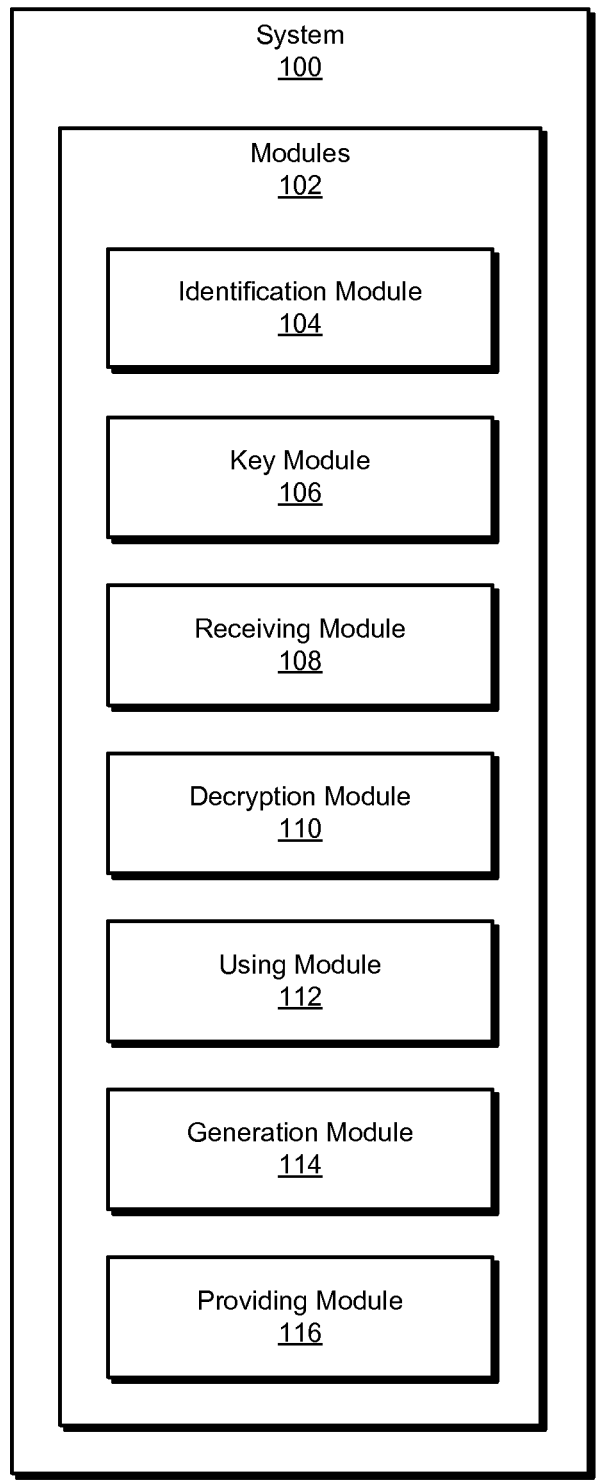
FIG. 1 is a block diagram of an exemplary system for sharing data stored on secure third-party storage platforms.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents and alternatives falling within the scope of the appended claims.

DETAILED DESCRIPTION OF EXEMPLARY EMBODIMENTS

The present disclosure is generally directed to systems and methods for sharing data stored on secure third-party storage platforms. As will be explained in greater detail below, by maintaining asymmetric key pairs for encrypting and decrypting secured data (e.g., files and/or encryption keys for files) on a third-party storage server, encrypting the decryption keys of these asymmetric key pairs with encryption keys maintained by clients, and, on request, generating and providing tokens that correspond to temporary decryption data such that a user with a token may temporarily access secured data, the systems and methods described herein may simplify file sharing for users while limiting the exposure of users' sensitive data to cloud storage providers.

Figure 2:
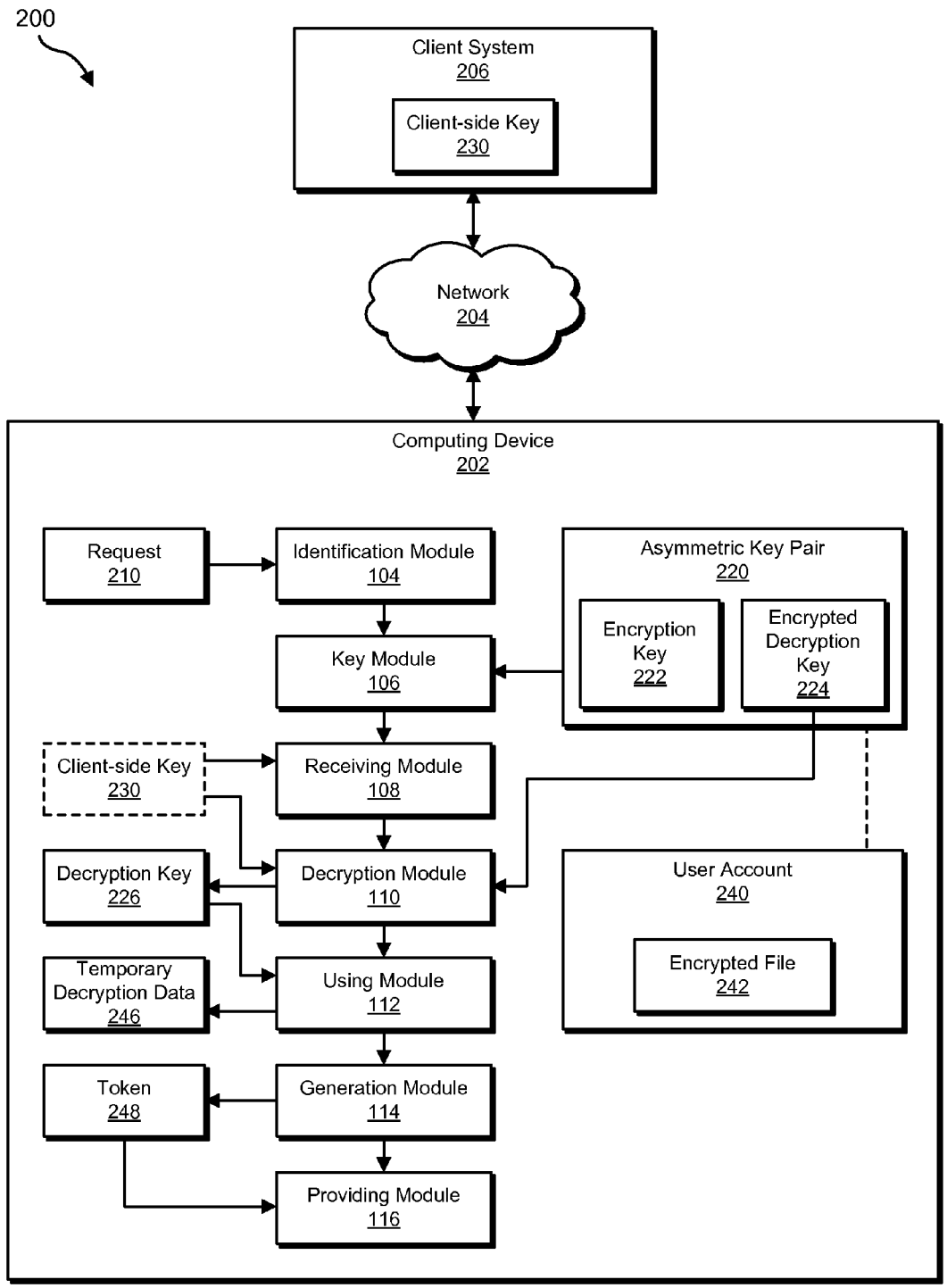
FIG. 2 is a block diagram of an exemplary system for sharing data stored on secure third-party storage platforms.
Figure 4:
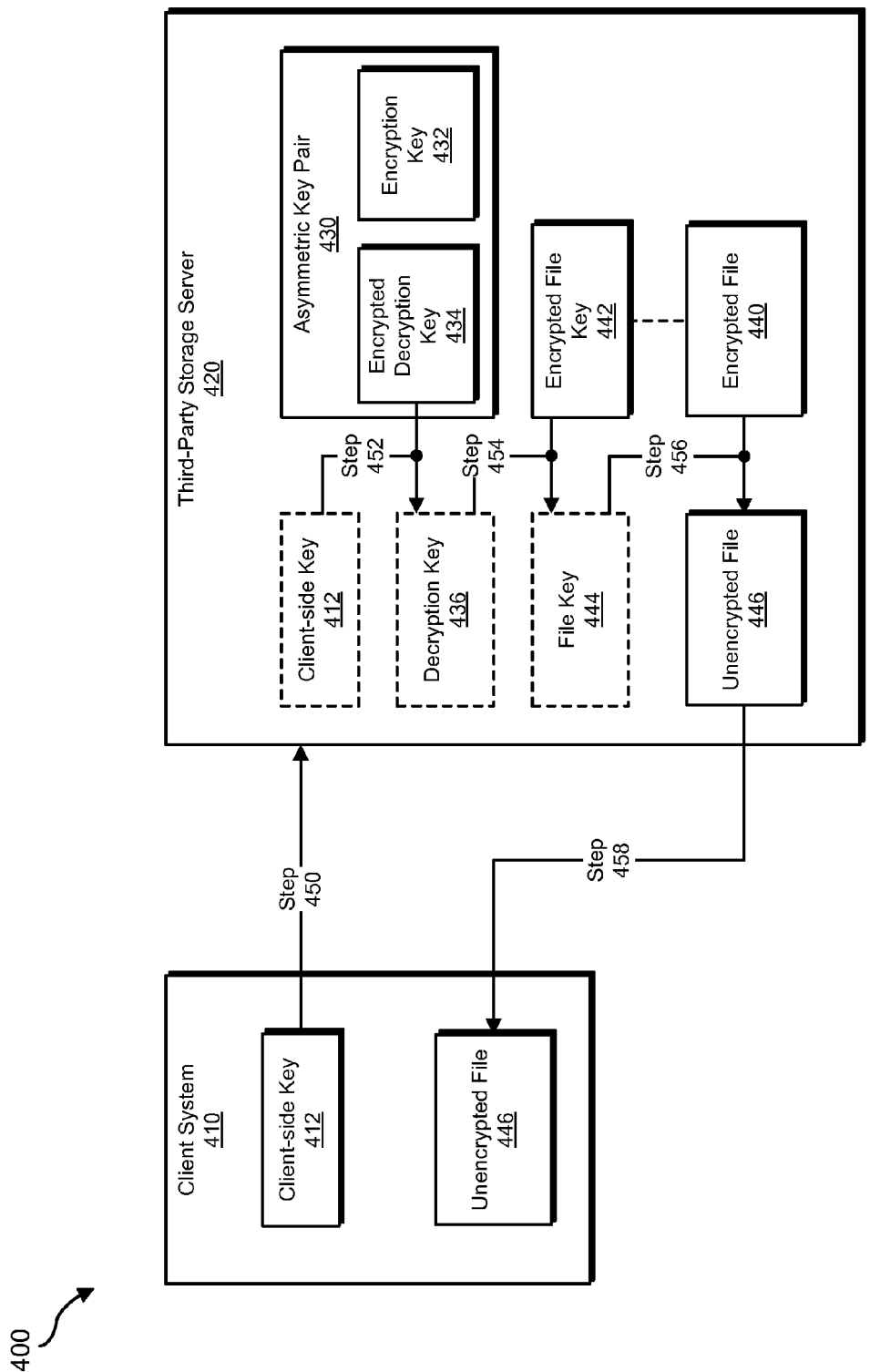
FIG. 4 is a block diagram of an exemplary system for secure third-party data storage.
Figure 5:
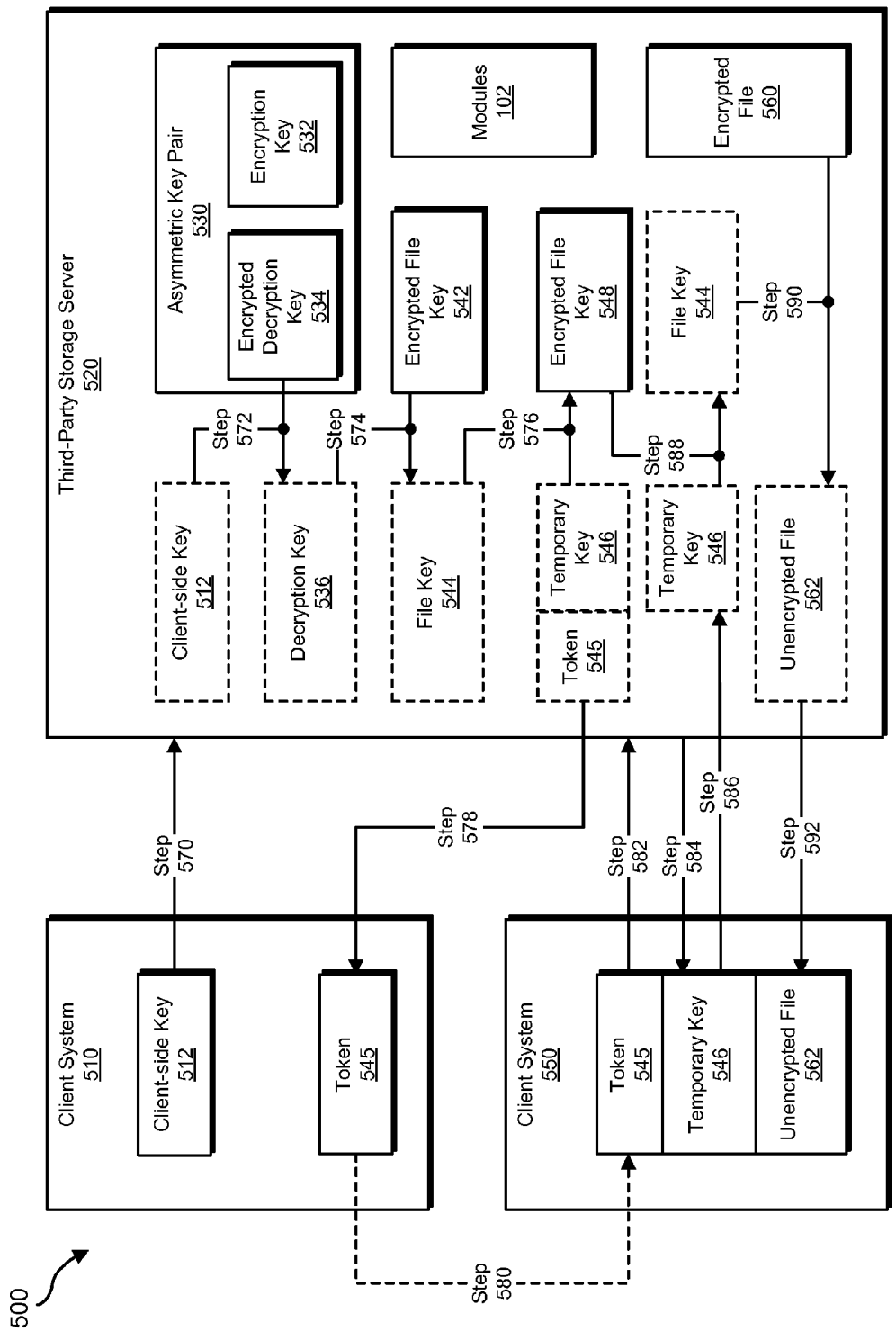
FIG. 5 is a block diagram of an exemplary system for sharing data stored on secure third-party storage platforms.

The following will provide, with reference to FIGS. 1, 2, and 5, detailed descriptions of exemplary systems for sharing data stored on secure third-party storage platforms. Detailed descriptions of corresponding computer-implemented methods will also be provided in connection with FIG. 3. Additionally, detailed descriptions of exemplary systems for secure third-party data storage will be provided in connection with FIG. 4. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for sharing data stored on secure third-party storage platforms. As illustrated in this figure, exemplary system 100 may include one or more modules 102 for performing one or more tasks. For example, and as will be explained in greater detail below, exemplary system 100 may include an identification module 104 that may identify, at a server-side computing system, a request from a client system for a token that provides temporary access to an encrypted file stored under a user account, where the temporary access requires decryption of the encrypted file. Exemplary system 100 may also include a key module 106 that identifies, in response to the request, an asymmetric key pair designated for the user account and that includes an encryption key and a decryption key that has been encrypted with a client-side key. Exemplary system 100 may additionally include a receiving module 108 that may receive, from the client system, the client-side key. Exemplary system 100 may also include a decryption module 110 that may decrypt the decryption key with the client-side key. Exemplary system 100 may additionally include a using module 112 that may use the decryption key to generate temporary decryption data that facilitates the decryption of the encrypted file and that may be set to expire. Exemplary system 100 may also include a generation module 114 that may generate the token and designate the temporary decryption data as available in exchange for the token. Exemplary system 100 may additionally include a providing module 116 that may provide the token to the client system. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or client system 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a client system 206 via a network 204 (to provide, e.g., third-party storage services to client system 206). Computing device 202 may be programmed with one or more of modules 102. Additionally or alternatively, client system 206 may be programmed with one or more of modules 102.

In one embodiment, one or more of modules 102 from FIG. 1 may, when executed by at least one processor of computing device 202 and/or client system 206, facilitate computing device 202 and/or client system 206 in sharing data stored on secure third-party storage platforms. For example, and as will be described in greater detail below, one or more of modules 102 may cause computing device 202 and/or client system 206 to share data stored on secure third-party storage platforms. For example, and as will be described in greater detail below, identification module 104 may be programmed to identify, at a client system 206, a request 210 from client system 206 for a token 248 that provides temporary access to an encrypted file 242 stored under a user account 240, where the temporary access requires decryption of encrypted file 242. Key module 106 may be programmed to identify, in response to request 210, an asymmetric key pair 220 designated for user account 240, asymmetric key pair 220 including an encryption key 222 and a decryption key 226 that has been encrypted with a client-side key 230 (i.e., an encrypted decryption key 224). Receiving module 108 may be programmed to receive, from the client system, client-side key 230. Decryption module 110 may be programmed to decrypt encrypted decryption key 224 with client-side key 230 (producing decryption key 226). Using module 112 may be programmed to use decryption key 226 to generate temporary decryption data 246 that facilitates the decryption of encrypted file 242 and that is set to expire. Generation module 114 may be programmed to generate token 248 and designate temporary decryption data 246 as available in exchange for token 248. Providing module 116 may be programmed to provide token 248 to the client system.

Computing device 202 and client system 206 generally represent any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and client system 206.

Figure 3:
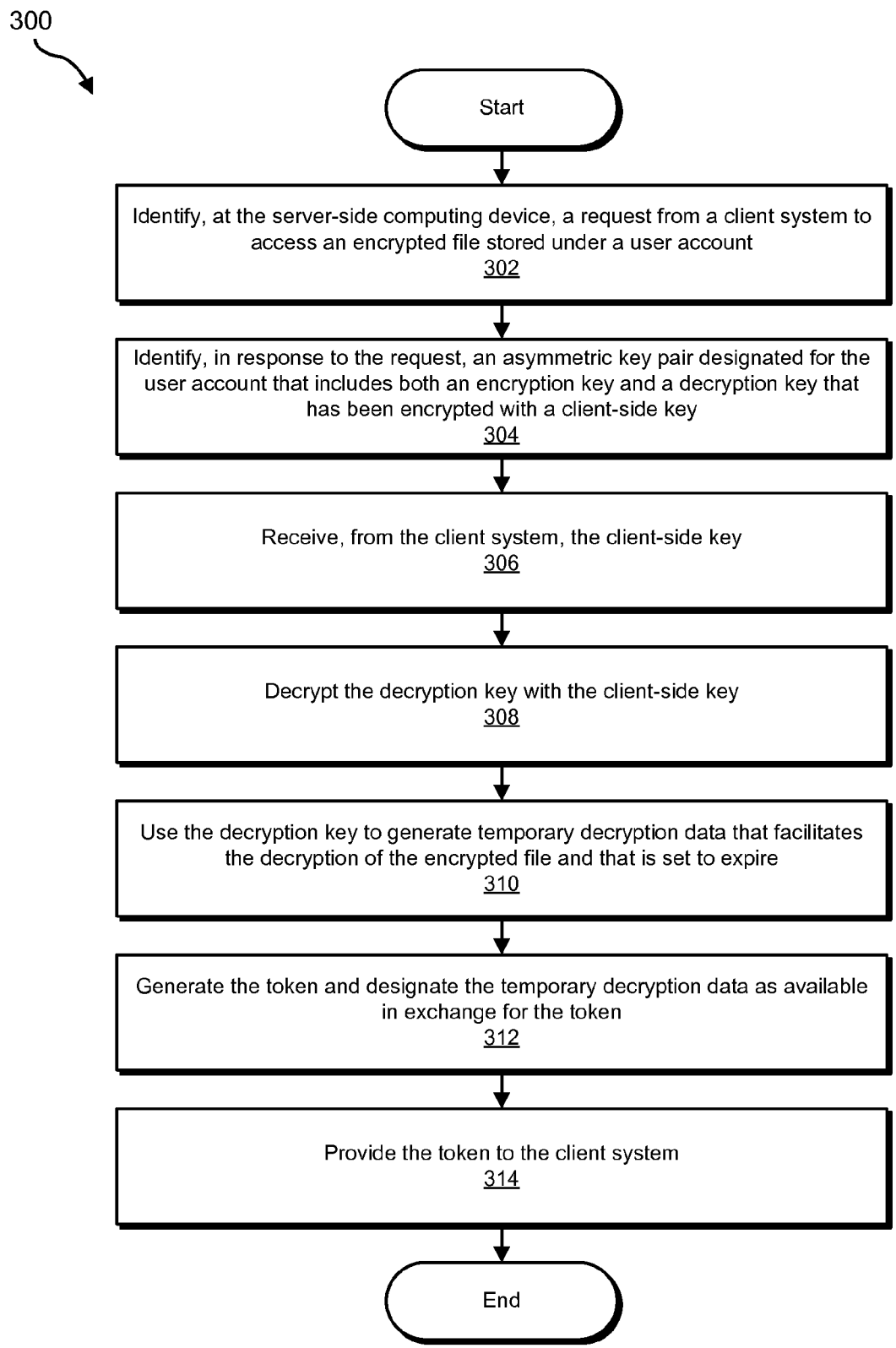
FIG. 3 is a flow diagram of an exemplary method for sharing data stored on secure third-party storage platforms.

FIG. 3 is a flow diagram of an exemplary computer-implemented method 300 for sharing data stored on secure third-party storage platforms. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify, at a server-side computing system, a request from a client system for a token that provides temporary access to an encrypted file stored under a user account, where the temporary access requires decryption of the encrypted file. For example, at step 302 identification module 104 may, as part of computing device 202 in FIG. 2, identify, at client system 206, request 210 from client system 206 for token 248 that provides temporary access to encrypted file 242 stored under user account 240, where the temporary access requires decryption of encrypted file 242.

In some examples, the server-side computing device may operate as part of a third-party storage system. As used herein, the term "third-party storage system" may refer to any type or form of storage system, including a cloud-based storage system, that is capable of storing data on behalf of a user. In some examples, the third-party storage system may store data for multiple distinct entities. In at least one example, the entities that store data with the third-party storage system may require data security against each other (in order to, e.g., prevent unprivileged access of data across entities), against intruders (e.g., entities not authorized to access data stored within the third-party storage system), and/or one or more administrators of the third-party storage system. In some examples, the third-party storage system may represent or include a single-instance storage system (i.e., a storage system configured to only store a single instance of each item of content for multiple owners).

Accordingly, the client system may, in turn, include any system for facilitating the use of a third-party storage system. In some examples, the client system may be owned and/or administrated by an entity distinct from an owner and/or administrator of the server-side computing device.

As used herein, the term "file" may refer to any suitable unit of data, including, without limitation, a file, data object, data segment, portion of a data stream, database, database entry, and/or electronic document. In addition, the phrase "user account" may refer to any identifier and/or privilege system that may correspond to a data owner (used, e.g., to identify data owned by the data owner and/or to secure data owned by the data owner for use by the data owner).

Identification module 104 may identify any suitable type of request. For example, as will be explained in greater detail below, identification module 104 may identify a request to retrieve a token that can be temporarily used (e.g., by a party that does not have a user account with the third-party storage system mentioned earlier) to access an unencrypted version of the encrypted file. In some examples, as will be described in greater detail below, the requested token may be designed to be easily shared with desired recipients in out-of-band communications (e.g., in a telephone conversation).

Identification module 104 may receive the request in any of a variety of contexts. For example, identification module 104 may receive a user-initiated request from the client system. Additionally or alternatively, and as will be explained in greater detail below, identification module 104 may receive an implicit request for the token simply by receiving a client-side key from the client system that enables access to the encrypted file.

At step 304 one or more of the systems described herein may identify, in response to the request, an asymmetric key pair designated for the user account, the asymmetric key pair including an encryption key and a decryption key that has been encrypted with a client-side key. For example, at step 304 key module 106 may, as part of computing device 202 in FIG. 2, identify, in response to request 210, asymmetric key pair 220 designated for user account 240, asymmetric key pair 220 including an encryption key 222 and decryption key 226 that has been encrypted with client-side key 230 (i.e., encrypted decryption key 224).

As used herein, the phrase "asymmetric key pair" may refer to any pair of cryptographic keys that includes both an encryption key (or "public key") and a decryption key (or "private key"). The encryption key may include any key that does not require secrecy in order to secure data encrypted with the key. For example, the encryption key may be used to encrypt data using an asymmetric key algorithm. Consequently, decrypting data encrypted with the encryption key may require the corresponding decryption key of the asymmetric key pair. In some examples, the asymmetric key pair may be stored on and/or by a third-party storage system. In at least one example, neither the encryption key nor the decryption key may be distributed outside the third-party storage system.

In addition, the phrase "client-side key," as used herein, may refer to any suitable cryptographic key or keys for encrypting and/or decrypting the decryption key of the asymmetric key pair. In some examples, the client-side key may include a symmetric key (e.g., a key usable for both encrypting data and decrypting said data). For example, the client-side key may be configured to encrypt and decrypt data according to an Advanced Encryption Standard specification (e.g., AES-256). In some examples, the client-side key may be generated on the client system. For example, the client-side key may be generated using a key derivation function, such as a password-based key derivation function (e.g., PBKDF2).

In some examples, the client-side key may be cached on the client system. Additionally or alternatively, the client-side key may be generated as needed from a password (e.g., generated either at the client system or at a third-party storage system). In some examples, the client-side key may be retrieved from an external key store. As will be explained in greater detail below, in some examples the client-side key may not be stored on the server-side computing device and/or within a third-party storage system implemented by the server-side computing device. In some examples, the client-side key may be accessible only by a corresponding client. This client may correspond to an organization, a group with shared secrets, a computing device, and/or any other suitable entity.

In some examples, one or more of the systems described herein may have used the encryption key within the asymmetric key pair to encrypt the encrypted file. For example, one or more of the systems described herein may receive the unencrypted version of the encrypted file from the client system and then generate the encrypted file. These systems may generate the encrypted file by generating a file key based on at least one characteristic of the unencrypted version of the encrypted file and then encrypting the unencrypted version of the encrypted file with the file key. For example, these systems may derive a hash of the unencrypted version of the encrypted file and base the file key on the hash. In this manner, the systems and methods described herein may produce identical encrypted files from identical unencrypted files, allowing for deduplication across clients.

For example, the systems described herein may deduplicate the encrypted file with an additional encrypted file that is encrypted with the file key. Upon generating the file key, these systems may encrypt the file key with the encryption key. The term "deduplication," as used herein, may refer to one or more operations related to reducing the amount of storage space used in a single-instance data storage system, including operations for detecting and preventing data from being redundantly stored to the single-instance data storage system. Deduplication may be performed using any suitable deduplication technology or algorithm. In some examples, deduplication may include file-level deduplication. Additionally or alternatively, deduplication may include block-level deduplication.

In addition to encrypting the unencrypted version of the encrypted file, in some examples one or more of the systems described herein may perform one or more operations based on the unencrypted version of the encrypted file (e.g., before encrypting the unencrypted version of the encrypted file and thereby losing access to the unencrypted version of the encrypted file). For example, one or more of the systems described herein may index the contents of the unencrypted version of the encrypted file, perform an anti-malware scan on the unencrypted version of the encrypted file, generate a preview of the contents of the unencrypted version of the encrypted file, etc. In these examples, these systems may associate metadata generated from the unencrypted version of the encrypted file with the encrypted file once the encrypted file is encrypted.

Key module 106 may identify the asymmetric key pair designated for the user account in any suitable manner. In some examples, a third-party storage system may host data for multiple user accounts, each with a designated and distinct asymmetric key pair. Accordingly, key module 106 may identify the asymmetric key pair for the user account according to one or more identifiers and/or credentials provided by the client system.

Returning to FIG. 3, at step 306 one or more of the systems described herein may receive, from the client system, the client-side key. For example, at step 306 receiving module 108 may, as part of computing device 202 in FIG. 2, receive, from the client system, client-side key 230.

As mentioned earlier, in some examples the client-side key may not be stored on the server side (i.e., on the server-side computing device and/or an associated third-party storage system). For example, receiving module 108 may receive the client-side key and store the client-side key in volatile memory without storing the client-side key in non-volatile memory. As used herein, the phrase "volatile memory" may refer to any non-persistent and/or temporary storage location. In some examples, the phrase "volatile memory" may refer to random access memory. In addition, the phrase "non-volatile memory" may refer to any persistent storage location. For example, the phrase "non-volatile memory" may refer to a storage device used by a file system to store one or more files. In some examples, receiving module 108 may receive the client-side key and not preserve the client-side key after use. For example, receiving module 108 may discard the client-side key after a session with the client system has terminated.

Receiving module 108 may receive the client-side key from the client system in any of a variety of ways. For example, receiving module 108 may receive the client-side key from the client system directly. Additionally or alternatively, receiving module 108 may receive the client-side key from the client system by receiving data representing the client-side key and from which the client-side key may be generated. For example, receiving module 108 may receive a password for a key derivation function from the client system and use this key derivation function to generate the client-side key from the password. In this example, receiving module 108 may also keep the password only in non-volatile memory and/or discard the password upon using the password to generate the client-side key.

Returning to FIG. 3, at step 308 one or more of the systems described herein may decrypt the decryption key with the client-side key. For example, at step 308 decryption module 110 may, as part of computing device 202 in FIG. 2, decrypt encrypted decryption key 224 with client-side key 230 (producing, e.g., decryption key 226).

Decryption module 110 may decrypt the decryption key in any suitable manner. For example, decryption module 110 may apply the client-side key to the decryption key according to a predetermined symmetric key algorithm to generate a decrypted version of the decryption key.

As will be discussed in greater detail below (e.g., with reference to step 310 of FIG. 3), in some examples the systems described herein may use the decryption key to generate temporary decryption data and associate the decryption key with a token that can temporarily be used to access the temporary decryption data, and, thus, the decrypted file. Additionally, in some examples, one or more of the systems described herein may use the decryption key to retrieve an unencrypted version of the encrypted file (e.g., for the client system). An example of such a system is provided in FIG. 4, which illustrates an exemplary system 400 for secure third-party data storage.

As shown in FIG. 4, exemplary system 400 may include a client system 410 configured to store one or more files via a third-party storage service facilitated by third-party storage server 420. For example, client system 410 may have previously transmitted an unencrypted file 446 to third-party storage server 420. Third-party storage server 420 may have identified an asymmetric key pair 430 associated with client system 410 and encrypted unencrypted file 446 using an encryption key 432. In one example, client system 410 may attempt to retrieve unencrypted file 446, now stored on third-party storage server 420 as encrypted file 440. For example, at step 450 client system 410 may transmit a message to third-party storage server 420 requesting unencrypted file 446 and including client-side key 412. Third-party storage server 420 may accordingly receive client-side key 412 and maintain client-side key 412 in memory for use.

At step 452, third-party storage server 420 may identify asymmetric key pair 430 and decrypt an encrypted decryption key 434 with client-side key 412 to result in decryption key 436. At step 454, third-party storage server 420 may use decryption key 436 to decrypt an encrypted file key 442 to obtain a file key 444 for encrypted file 440. At step 456, third-party storage server 420 may use file key 444 to decrypt encrypted file 440 and obtain unencrypted file 446. At step 458, third-party storage server 420 may transmit unencrypted file 446 to client system 410, fulfilling the request by client system 410. Third-party storage system 420 may additionally discard client-side key 412, decryption key 436, and file key 444, and delete unencrypted file 446.

While the system illustrated in FIG. 4 may securely provide access to an unencrypted version of an encrypted file stored on a third-party storage service, in some examples an owner of a user account may wish to provide temporary access to the unencrypted version of the encrypted file to another person without sharing the owner's client-side key and without compromising the security of the owner's data by exposing the owner's data (e.g., the unencrypted version of the encrypted file) to the third-party storage service. Accordingly, as will be discussed in greater detail below, the systems described herein may create temporary decryption data and an associated token used for sharing access to the unencrypted version of the encrypted file on a temporary basis.

Returning to FIG. 3, at step 310 one or more of the systems described herein may use the decryption key to generate temporary decryption data that facilitates the decryption of the encrypted file and that is set to expire. For example, at step 310 using module 112 may, as part of computing device 202 in FIG. 2, use decryption key 226 to generate temporary decryption data 246 that facilitates the decryption of encrypted file 242 and that is set to expire.

Using module 112 may use the decryption key to generate the temporary decryption data in any suitable manner. For example, as described earlier, the encrypted file may be encrypted with a file key which is also encrypted. In this example, using module 112 may use the decryption key to decrypt the file key. Using module 112 may then generate a temporary encryption key and create a temporary copy of the file key that is encrypted with the temporary encryption key. The temporary decryption data may therefore include the temporary encryption key (e.g., a symmetric encryption key) and/or the temporary encrypted file key. In some examples, using module 112 may not store the temporary decryption data on a persistent storage device (e.g., on the server-side computing device and/or an associated third-party storage system), but instead temporarily maintain the temporary decryption data in volatile memory (e.g., without storing the temporary decryption data in non-volatile memory).

Using module 112 may generate the temporary decryption data in any suitable format. In some examples, using module 112 may generate a uniform resource locator that includes the temporary decryption data. For example, the uniform resource locator may point to a resource of the server-side computing system (and/or a resource of an associated resource third-party storage system) and include the temporary decryption data as a parameter. As will be explained in greater detail below, the server-side computing system may, upon receiving the temporary decryption data as a parameter via a request for a resource described by the uniform resource locator, use the temporary decryption data to provide access to an unencrypted version of the encrypted file.

Using module 112 may set the temporary decryption data to expire according to any of a variety of criteria. For example, using module 112 may set the temporary decryption data to expire after a predetermined time period (e.g., 15 minutes). Additionally or alternatively, using module 112 may set the temporary decryption data to expire after a predetermined number of access events (e.g., after the temporary decryption data is accessed by one person, by three people, etc.). As will be explained in greater detail below, after the temporary decryption data and/or the associated token expires, one or more systems described herein may remove the temporary decryption data and/or the associated token (e.g., from volatile memory).

Returning to FIG. 3, at step 312 one or more of the systems described herein may generate the token and designate the temporary decryption data as available in exchange for the token. For example, at step 312 generation module 114 may, as part of computing device 202 in FIG. 2, generate token 248 and designate temporary decryption data 246 as available in exchange for token 248.

Generation module 114 may generate the token according to any suitable specification. In some embodiments, generation module 114 may generate a short token (e.g., to make the token easier to relate to other people, to remember, and/or to enter into an interface). Additionally, generation module 114 may generate tokens with a length such that the ratio of the number of tokens in use at any given time to the number of possible tokens of the length falls below a predetermined threshold (e.g., to reduce the probability of an allocated token being randomly guessed and/or selected). In some examples, generation module 114 may dynamically select the length of the token based on the rate at which tokens are generated. For example, generation module 114 may select a greater length for the token when many tokens are currently allocated and/or have been recently generated and may select a lesser length for the token when relatively few tokens are currently allocated and/or have been recently generated.

In some examples, generation module 114 may generate the token according to a specification that is designed to facilitate storing the token in human working memory. For example, generation module 114 may generate the token to include a predetermined number of chunks (e.g., characters, words, simple images, etc.) that can be stored in the working memory of a supermajority of people (e.g., at least 98 percent of Internet users). In one example, generation module 114 may generate the token to be five characters long. In another example, generation module 114 may generate the token to be six or seven characters long. In some examples, generation module 114 may use only alphanumeric characters to generate the token. In one example, generation module 114 may generate the token to be case-insensitive (e.g., because including case information may substantially decrease recall of the token from working memory to a greater degree compared to other methods of increasing the entropy of the token, such as increasing the length of the token). In some examples, generation module 114 may generate the token to be four, five, or six words long. Generation module 114 may generate word-based tokens using simplified dictionaries of the requested language. For example, if the request is for an English-based token, generation module 114 may use a Special English word list and/or a Basic English word list to generate a word-based token. Additionally or alternatively, generation module may use a word list of words that are commonly spelled correctly and/or a word list that excludes heterographic homophones and/or near homophones.

Generation module 114 may designate the temporary decryption data as available in exchange for the token in any suitable manner. For example, generation module 114 may store the token and the temporary decryption data as a key-value pair (where the token is the key and the temporary decryption data is the associated value). In some examples, generation module 114 may store the token only in volatile memory (and not in non-volatile memory).

Returning to FIG. 3, at step 314 one or more of the systems described herein may provide the token to the client system. For example, at step 314 providing module 116 may, as part of computing device 202 in FIG. 2, provide token 248 to the client system.

Providing module 116 may provide the token to the client system in any suitable manner. For example, providing module 116 may provide the token to the client system via a graphical user interface (e.g., by displaying the token within a web page sent in response to the request for the token). Additionally or alternatively, providing module 116 may provide the token by emailing the token (e.g., to an email address associated with the user account).

Once the owner of the user account receives the token, in some examples the owner of the user account may convey the token to one or more authorized recipients using an out-of-band communication method. For example, the owner of the user account may share the token over a telephone conversation, in an in-person conversation and/or announcement, and/or by writing the token on a whiteboard. Subsequently, one or more recipients of the token may (e.g., before the token and/or temporary decryption data expires) submit the token to receive the temporary decryption data and access an unencrypted version of the encrypted file.

In some examples, one or more of the systems described herein (e.g., providing module 116) may receive the token from an additional client system and provide the temporary decryption data to the additional client system in response to receiving the token. For example, the owner of the user account may have related the token to a recipient and the recipient may have provided the token via the additional client system. Providing module 116 may receive the token in any of a variety of ways. For example, providing module 116 may receive the token through graphical user interface input (e.g., a web form submission), a text message, a voice stream (e.g., interpreted with voice recognition systems), etc. Providing module 116 may provide the temporary decryption data in any suitable format. As mentioned earlier, in some examples providing module 116 may provide the temporary decryption data within a uniform resource locator. In some examples, providing module 116 may provide the temporary decryption data by redirecting a web browser (e.g., into which the token was entered) to the uniform resource locator that contains the temporary decryption data.

After providing the temporary decryption data, the systems described herein (e.g., providing module 116) may receive the temporary decryption data from the additional client system, use the temporary decryption data to decrypt the encrypted file, and provide access to an unencrypted version of the encrypted file to the additional client system. For example, providing module 116 may receive the temporary decryption data via a hypertext transfer protocol request after having redirected the additional client system to a uniform resource locator that contains the temporary decryption data. Providing module 116 may use the temporary decryption data to decrypt the encrypted file in any suitable manner. For example, providing module 116 may decrypt a file key with the temporary decryption data and then decrypt the encrypted file with the file key. In some examples, providing module 116 may then allow the additional client system to download the decrypted version of the encrypted file. Additionally or alternatively, providing module 116 may allow the additional client system to view, browse, and/or search the unencrypted version of the encrypted file.

As mentioned earlier, the temporary decryption data may be set to expire. In some examples, the temporary decryption data may be set to expire in conjunction with and/or as a result of the token expiring. Accordingly, one or more of the systems described herein (e.g., providing module 116) may determine that the token has expired (e.g., based on a predetermined amount of time passing since the issuance of the token). Providing module 116 may therefore designate the temporary decryption data as no longer available in exchange for the token in response to determining that the token has expired. For example, providing module 116 may remove the token and/or the temporary decryption data (e.g., from volatile memory).

In some examples, one or more of the systems described herein (e.g., providing module 116) may prevent attempts to guess the token and/or brute force attacks to find active tokens. In one example, providing module 116 may receive an unassigned token from an additional client system and prevent the additional client system from receiving the temporary decryption data in exchange for the token based on having received the unassigned token from the additional client system. For example, providing module 116 may determine that the additional client system has submitted above a predetermined threshold of unassigned tokens within a predetermined time span. As an example, providing module 116 may determine that the additional client system has submitted three unassigned tokens within ten minutes and may therefore blacklist the additional client system from submitting tokens (e.g., for the next hour). Additionally or alternatively, providing module 116 may present a CAPTCHA to the additional client system in response to receiving the unassigned token from the additional client system and require that the additional client system provide a correct solution to the CAPTCHA before providing the additional client system with the temporary decryption data in exchange for the token. As used herein, the term "CAPTCHA" may refer to any test used to distinguish human interaction from bot interaction. For example, the CAPTCHA may include a distorted character recognition test and/or a knowledge test.

FIG. 5 illustrates an exemplary system 500 for sharing data stored on secure third-party storage platforms. As shown in FIG. 5, exemplary system 500 may include a client system 510 and a client system 550 in communication with a third-party storage server 520. Third-party storage server 520 may be programmed with one or more of modules 102. Using FIG. 5 as an example, a user of client system 510 may have access to the unencrypted contents of an encrypted file 560 by the use of a client-side key 512. However, the user of client system 510 may wish to share the contents of encrypted file 560 with a user of client system 550 on a limited and/or temporary basis. At step 570, client system 510 may request that third-party storage server create a temporary key 546 to share that can be used to access the contents of encrypted file 560 on a limited and/or temporary basis. As part of the request, client system 510 may transmit client-side key 512 to third-party storage server 520.

Third-party storage server 520 may hold client-side key 512 in volatile memory without storing client-side key 512. An asymmetric key pair 530 may include an encryption key 532 (previously used to encrypt a file key 544 used to encrypt encrypted file 560) and an encrypted decryption key 534. At step 572, third-party storage server 520 may use client-side key 512 to decrypt encrypted decryption key 534, producing a decryption key 536, which third-party storage server 520 may hold in volatile memory and not store. Third-party storage server 520 may then discard client-side key 512 from memory. At step 574, third-party storage server 520 may decrypt an encrypted file key 542 with decryption key 536 to produce file key 544, which third-party storage server 520 may hold in volatile memory and not store. Third-party storage server 520 may then discard decryption key 536 from memory.

Third-party storage server 520 may also generate a token 545 and a temporary key 546. At step 576, third-party storage server 520 may encrypt file key 544 with temporary key 546, producing an encrypted file key 548. At step 578, third-party storage server 520 may transmit token 545 to client system 510. At step 580, the user of client system 510 may provide token 545 to the user of client system 550 (e.g., in person, over the telephone, etc.). At step 582, client system 550 may request access of third-party storage server 520 to encrypted file 560 by entering and transmitting token 545. At step 584, third-party storage server 520 may determine that temporary key 546 corresponds to token 545 and transmit temporary key 546 (e.g., within a uniform resource locator) to client system 550). At step 586, client system 550 may transmit temporary key 546 to third-party storage server 520 (e.g., by requesting the resource of the uniform resource locator). At step 588, third-party storage server 520 may decrypt encrypted file key 548 with temporary key 546 to produce file key 544. At step 590, third-party storage server 520 may decrypt encrypted file 560 with file key 544 to produce unencrypted file 562, and discard file key 544 from memory. At step 592, third-party storage server 520 may transmit unencrypted file 562 (or a portion of unencrypted file 562) to client system 550. After a predetermined amount of time from the generation of token 545 (e.g., 15 minutes), third-party storage server 520 may expire token 545 and/or temporary key 546 by discarding token 545 and/or temporary key 546 from memory. In some examples, third-party storage server 520 may also discard encrypted file key 548 once token 545 has expired.

As explained above in connection with method 300 in FIG. 3, by maintaining asymmetric key pairs for encrypting and decrypting secured data (e.g., files and/or encryption keys for files) on a third-party storage server, encrypting the decryption keys of these asymmetric key pairs with encryption keys maintained by clients, and, on request, generating and providing tokens that correspond to temporary decryption data such that a user with a token may temporarily access secured data, the systems and methods described herein may simplify file sharing for users while limiting the exposure of users' sensitive data to cloud storage providers.

In one example, a third-party storage system may enable a user to retrieve data by entering a short token using a graphical user interface of a web or mobile client, by voicing the token to a device with voice recognition technology, and/or by sending the token via a text message to a predefined text message code associated with the third-party storage system. The short token may be designed to be easily remembered at least for a short time (e.g., less than an hour) and may be communicated to recipients out of band (e.g., over the phone, in a conference room announcement, on a whiteboard, etc.). The recipients may not have accounts with the third-party storage system and may not need to authenticate themselves to access the data beyond providing the short token. The time-to-live of the short token may be short (e.g., 15 minutes or less). The system may create both the short token and a uniform resource locator containing key material required to decrypted shared files (as well as a mapping from the short token to the uniform resource locator). When a request with the short token comes to the system, the system may redirect the client to the uniform resource locator (after which the client may no longer need the token). After the token expires, the mapping and the uniform resource locator may be cleared from the system completely. Therefore, the third-party storage provider may lose key material required to decrypt shared data and the file may be decrypted only when the system receives a request for the uniform resource locator. Thus, with the exception of the short period of the token's time-to-live, the confidentiality of the user's data may be the same as if the key material were never created. By keeping the token space sparsely populated, the system may detect data scraping attacks (e.g., because a randomly produced token may be unlikely to find a mapping to a uniform resource locator, and after a predefined number of misses the system may blacklist a client or require a user to solve a CAPTCHA in order to prevent scraping attacks by scripts).

Figure 6:
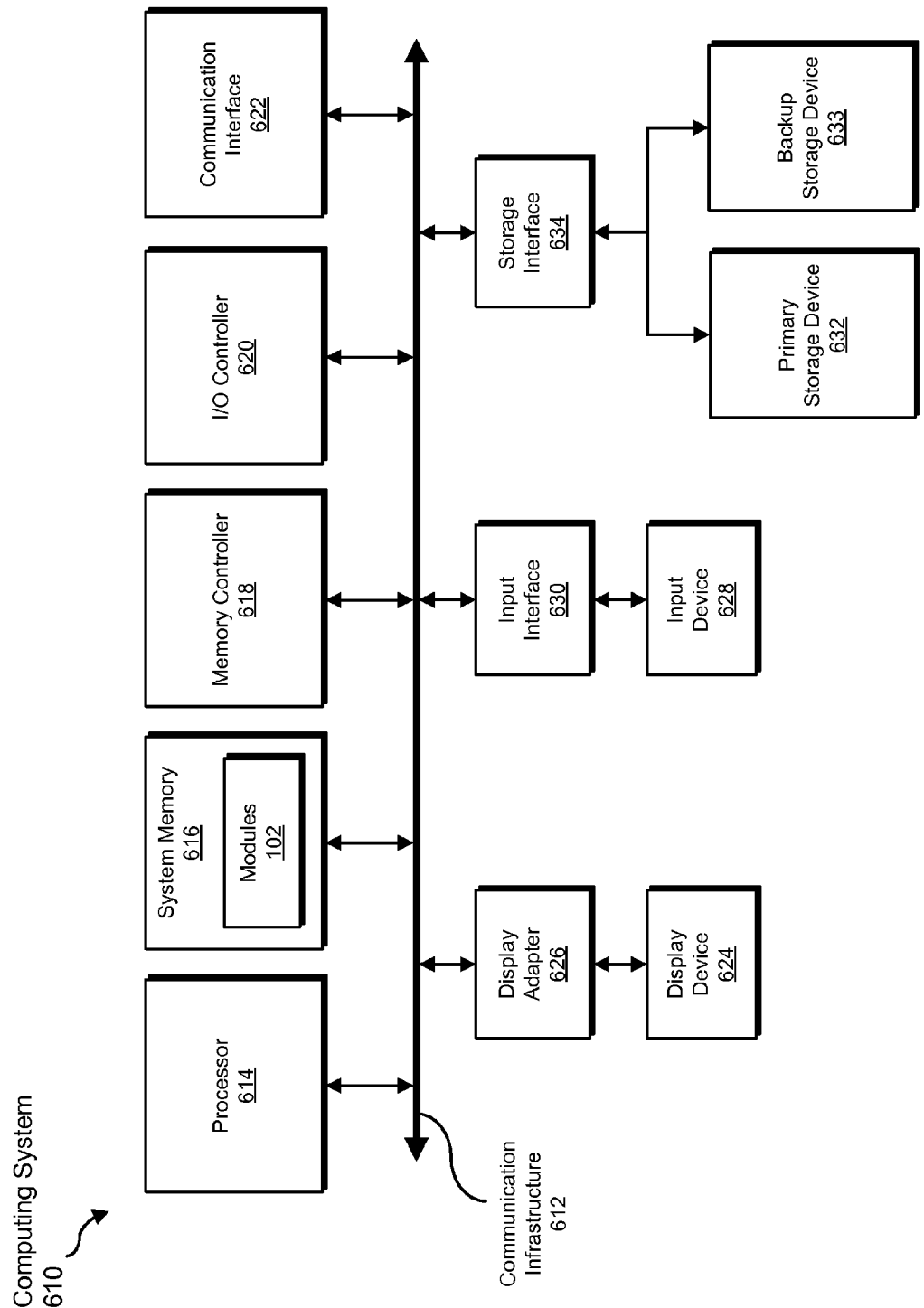
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
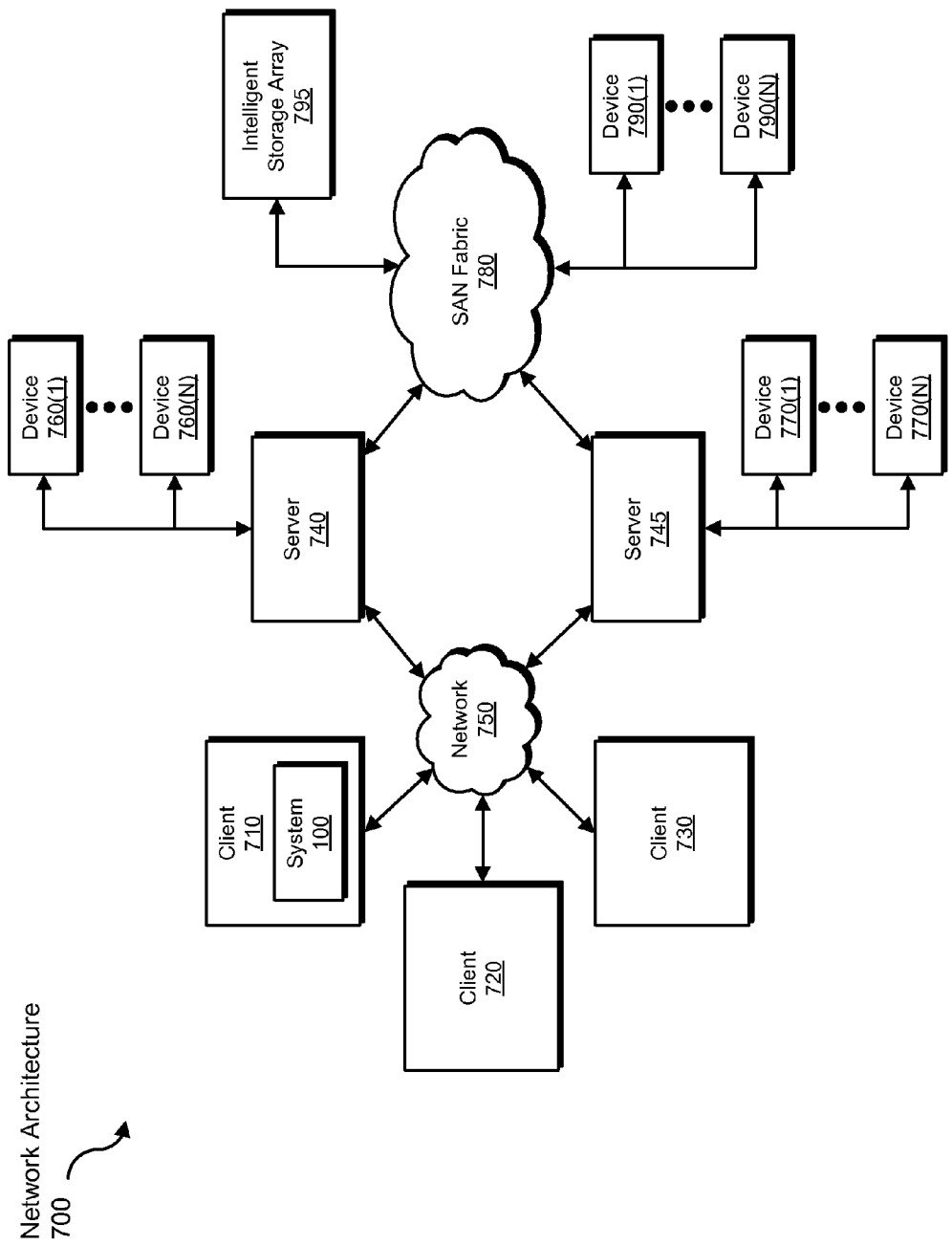
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760 (1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790 (1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for sharing data stored on secure third-party storage platforms.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a request to share the contents of an encrypted file, transform the request into a token useful for providing access to the contents of the encrypted file, output the token to a client device, use the token to provide access to the contents of the encrypted file to another client device, and store the contents of the encrypted file to the other client device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for sharing data stored on secure third-party storage platforms, at least a portion of the method being performed by a computing device comprising at least one processor, the method comprising:
    identifying, at a server-side computing system, a request from a client system for a token that provides temporary access to an encrypted file stored under a user account, wherein the temporary access requires decryption of the encrypted file;
    identifying, in response to the request, an asymmetric key pair designated for the user account, the asymmetric key pair comprising an encryption key and a decryption key that has been encrypted with a client-side key;
    receiving, from the client system, the client-side key;
    decrypting the decryption key with the client-side key;
    using the decryption key to generate temporary decryption data that facilitates the decryption of the encrypted file and that is set to expire by using the decryption key to generate a uniform resource locator that comprises the temporary decryption data;
    generating the token and designating the temporary decryption data as available in exchange for the token;
    providing the token to the client system.

2. The computer-implemented method of claim 1, further comprising:
    receiving the token from an additional client system;
    providing the temporary decryption data to the additional client system in response to receiving the token.

3. The computer-implemented method of claim 1, further comprising:
    receiving the temporary decryption data from an additional client system;
    using the temporary decryption data to decrypt the encrypted file;
    providing access to an unencrypted version of the encrypted file to the additional client system.

4. The computer-implemented method of claim 1, further comprising:
    determining that the token has expired;
    designating the temporary decryption data as no longer available in exchange for the token in response to determining that the token has expired.

5. The computer-implemented method of claim 1, wherein generating the token comprises generating the token according to a specification that is designed to facilitate storing the token in human working memory.

6. The computer-implemented method of claim 1, wherein generating the token comprises generating the token to be five characters long.

7. The computer-implemented method of claim 1, further comprising:
    receiving an unassigned token from an additional client system;
    preventing the additional client system from receiving the temporary decryption data in exchange for the token based on having received the unassigned token from the additional client system.

8. The computer-implemented method of claim 1, further comprising:
    receiving an unassigned token from an additional client system;
    presenting a CAPTCHA to the additional client system in response to receiving the unassigned token from the additional client system;
    requiring that the additional client system provide a correct solution to the CAPTCHA before providing the additional client system with the temporary decryption data in exchange for the token.

9. A system for sharing data stored on secure third-party storage platforms, the system comprising:
    an identification module that identifies, at a server-side computing system, a request from a client system for a token that provides temporary access to an encrypted file stored under a user account, wherein the temporary access requires decryption of the encrypted file;
    a key module that identifies, in response to the request, an asymmetric key pair designated for the user account, the asymmetric key pair comprising an encryption key and a decryption key that has been encrypted with a client-side key;
    a receiving module that receives, from the client system, the client-side key;
    a decryption module that decrypts the decryption key with the client-side key;
    a using module that uses the decryption key to generate temporary decryption data that facilitates the decryption of the encrypted file and that is set to expire by using the decryption key to generate a uniform resource locator that comprises the temporary decryption data;
    a generation module that generates the token and designates the temporary decryption data as available in exchange for the token;
    a providing module that provides the token to the client system;
    at least one processor configured to execute the identification module, the key module, the receiving module, the decryption module, the using module, the generation module, and the providing module.

10. The system of claim 9, wherein the providing module further:
    receives the token from an additional client system;
    provides the temporary decryption data to the additional client system in response to receiving the token.

11. The system of claim 9, wherein the providing module further:

receives the temporary decryption data from an additional client system;

uses the temporary decryption data to decrypt the encrypted file;

provides access to an unencrypted version of the encrypted file to the additional client system.

12. The system of claim 9, wherein the providing module further:

determines that the token has expired;

designates the temporary decryption data as no longer available in exchange for the token in response to determining that the token has expired.

13. The system of claim 9, wherein the generation module generates the token according to a specification that is designed to facilitate storing the token in human working memory.

14. The system of claim 9, wherein the generation module generates the token to be five characters long.

15. The system of claim 9, wherein the providing module further:

receives an unassigned token from an additional client system;

prevents the additional client system from receiving the temporary decryption data in exchange for the token based on having received the unassigned token from the additional client system.

16. The system of claim 9, wherein the providing module further:

receives an unassigned token from an additional client system;

presents a CAPTCHA to the additional client system in response to receiving the unassigned token from the additional client system;

requires that the additional client system provide a correct solution to the CAPTCHA before providing the additional client system with the temporary decryption data in exchange for the token.

17. A non-transitory computer-readable-storage medium comprising one or more computer-readable instructions that, when executed by at least one processor of a computing device, cause the computing device to:

identify, at a server-side computing system, a request from a client system for a token that provides temporary access to an encrypted file stored under a user account, wherein the temporary access requires decryption of the encrypted file;

identify, in response to the request, an asymmetric key pair designated for the user account, the asymmetric key pair comprising an encryption key and a decryption key that has been encrypted with a client-side key;

receive, from the client system, the client-side key;

decrypt the decryption key with the client-side key;

use the decryption key to generate temporary decryption data that facilitates the decryption of the encrypted file and that is set to expire by using the decryption key to generate a uniform resource locator that comprises the temporary decryption data;

generate the token and designate the temporary decryption data as available in exchange for the token;

provide the token to the client system.

18. The non-transitory computer-readable-storage medium of claim 17, wherein the one or more computer-readable instructions cause the computing device to receive the token from an additional client system and provide the temporary decryption data to the additional client system in response to receiving the token.

19. The non-transitory computer-readable-storage medium of claim 17, wherein the one or more computer-readable instructions cause the computing device to:

receive the temporary decryption data from an additional client system;

use the temporary decryption data to decrypt the encrypted file;

provide access to an unencrypted version of the encrypted file to the additional client system.

20. The non-transitory computer-readable-storage medium of claim 17, wherein the one or more computer-readable instructions cause the computing device to determine that the token has expired and designate the temporary decryption data as no longer available in exchange for the token in response to determining that the token has expired.

* * * * *